R. V. PEARCE.
SAW SHARPENING AND GUMMING MACHINE.
APPLICATION FILED MAR. 30, 1910.
1,027,428.
Patented May 28, 1912.
2 SHEETS—SHEET 1.
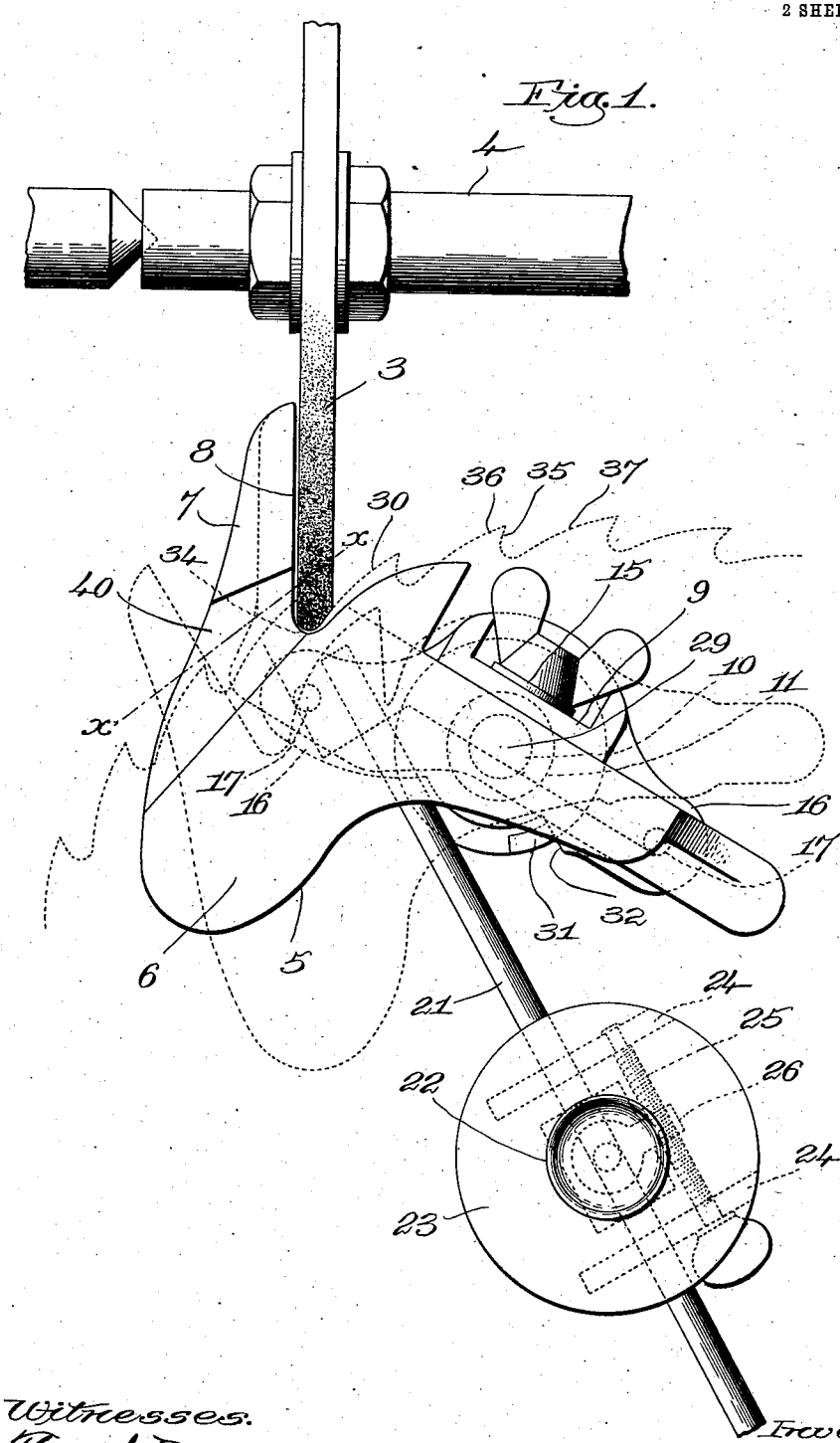

R. V. PEARCE.
SAW SHARPENING AND GUMMING MACHINE.
APPLICATION FILED MAR. 30, 1910.
1,027,428.
Patented May 28, 1912.
2 SHEETS—SHEET 2.
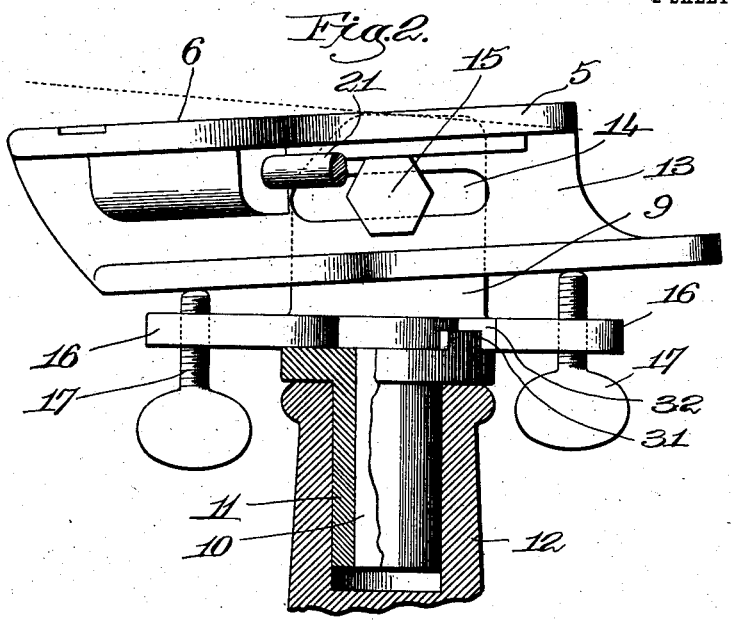
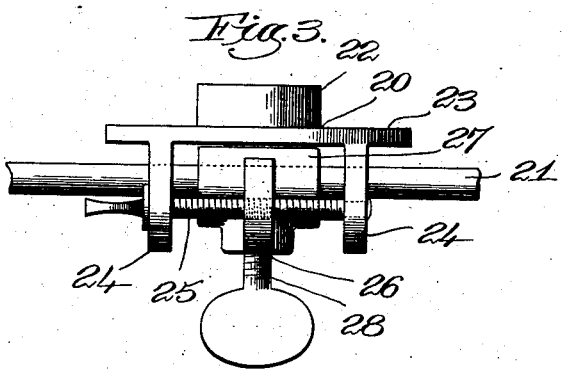
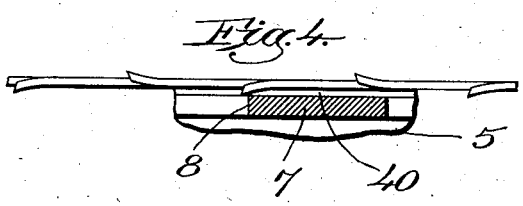
Witnesses.
Thomas J. Drummond
Joseph M. Ward.
Inventor.
Robert V. Pearce,
by Crosby Gregory
attys.
COLUMBIA PLANOGRAPH CO., WASHINGTON, D. C.

UNITED STATES PATENT OFFICE.

ROBERT V. PEARCE, OF CAMBRIDGE, MASSACHUSETTS.

SAW SHARPENING AND GUMMING MACHINE.

1,027,428.     Specification of Letters Patent.     Patented May 28, 1912.

Application filed March 30, 1910. Serial No. 552,350.

*To all whom it may concern:*

Be it known that I, ROBERT V. PEARCE, a citizen of the United States, residing at Cambridge, county of Middlesex, and State of Massachusetts, have invented an Improvement in Saw Sharpening and Gumming Machines, of which the following description, in connection with the accompanying drawing, is a specification, like characters on the drawing representing like parts.

This invention has for its object to provide a simple and inexpensive apparatus by means of which the teeth of a circular saw can be gummed and sharpened without destroying their proper shape.

The device is designed to be used in connection with an emery-wheel for sharpening and gumming the saw, and comprises a novel device for holding the saw in proper position, so that when the teeth are gummed and sharpened they will be given the correct shape.

The device is adjustable so that it can be used in gumming and sharpening saws of different sizes and saws having different shapes of teeth, and is so constructed that the saw tooth will always be given the correct shape regardless of the size of the saw or the length of the tooth, and that the saw will be kept perfectly true.

I will first describe one embodiment of my invention and then point out the novel features thereof in the appended claims.

Referring now to the drawings, Figure 1 is a plan view of a device embodying my invention; Fig. 2 is a side view thereof; Fig. 3 is a detail view of the saw-centering device; Fig. 4 is a section on the line $x$—$x$, Fig. 1 showing the manner in which the saw is supported by the saw-rest.

As stated above, my improved device is intended to be used in connection with an emery-wheel, and is of such a construction that it may be sustained on the frame of the emery-wheel or on any suitable machine with which the emery-wheel is used. One convenient way of using the device is to place the emery-wheel in an ordinary lathe, in which case my improved device can be secured to the carriage or tool support of the lathe.

In the drawings I have shown at 3 an emery-wheel which is carried on a shaft 4 that may conveniently be supported in an ordinary lathe and driven in any suitable way. My device comprises a saw-rest 5 on which rests the portion of the saw (shown in dotted lines Fig. 1) that is being ground or gummed. This saw-rest has the flat and somewhat extended surface 6 on which the saw is received and is provided with a gage-finger 7 having a gaging edge 8 which by coöperation with the side face of the emery-wheel 3 serves to help position the saw. This saw-rest 5 is adjustably carried by a holder 9 which is mounted to turn for a limited distance about a vertical axis so situated that when the saw-rest with the saw thereon is turned about said axis, the back side of the tooth in engagement with the emery-wheel will be ground to the proper shape. This holder may be sustained in a variety of ways to secure this operation, and I have herein shown it as provided with a stud 10 which is loosely received in a sleeve 11 that can be clamped to a fixed support 12 which may conveniently be the tool holder of a lathe or any other similar support. The saw-rest 5 is mounted on this holder 9 so that it can be adjusted longitudinally thereon and also can be given different angular positions. To accomplish this said saw-rest is provided with the web or flange 13 having the slot 14 therein through which passes a clamping bolt 15 that is sustained by the holder 9. Said holder is provided with two wings 16 through which extend set screws 17 that engage the bottom of the saw-rest and serve to hold it at the proper inclination. The saw which is to be ground is centered on a saw-centering device 20 which is herein shown as carried by an arm 21 extending from the saw-rest 5. This saw-centering device is shown as having a hub 22 which is adapted to be inserted through the center aperture of a saw, and the flange 23 on which the saw rests. Said saw-centering device is adjustable longitudinally of the arm 21 so as to accommodate saws of different diameters. For securing this adjustment, I have provided said device with two ears 24 through which the rod 21 passes and in which is rotatably mounted a screw 25 that extends through an ear 26 formed upon a hub 27. Said hub 27 is slidably mounted on the rod 21 and is clamped thereto by means of a clamping screw 28. For securing a rough adjustment of the saw-centering device the clamping screw 28 is loosened and said device is shifted longitudinally of the rod 21 into approximately the required position when the clamping screw 28 is tightened. A fine and correct adjustment can be secured by turning the adjusting screw 25, as will be obvious.

In using the device, the saw-centering member 20 will first be adjusted on the rod 21 so that when the saw to be gummed is placed on the centering device, the teeth will come approximately into the position shown in dotted lines Fig. 1. The saw-rest 5 is then adjusted longitudinally on the holder 9 so that the center or axial line 29 of said holder is at the center of the arc of the back side of the tooth occupying the position of the tooth 30 in Fig. 1. The holder is then adjusted in the support 12 so that when the gage edge 8 of the finger 7 stands in parallelism with the side of the emery-wheel 3, the stop 31 on the sleeve 11 will abut against the shoulder 32 on the holder 9. The saw is then turned so as to press the front edge of the tooth 34 against the emery-wheel to properly grind said tooth, and then the saw-rest with the saw thereon is swung into the dotted line position Fig. 1 about the axis 29 or until the point of the tooth 30 has passed off from the emery-wheel 3. The position of the saw is then shifted about the centering member a distance of two teeth and the saw-rest is then brought back into the full line position so as to bring the edge 35 of the tooth 36 against the side of the emery-wheel to grind said edge, and the saw-rest and saw are then turned into the dotted line position Fig. 1 to grind the back side of the tooth 37. The saw is then turned about the centering member again a distance of two teeth and these operations are repeated.

The saw-rest it will be observed stands on a slight inclination so as to give the proper clearance to the cutting edges of the teeth. After each alternate tooth has been ground in this way, the adjusting screws 17 will be operated so as to swing the upper surface 6 of the saw-rest into the dotted line position Fig. 2, and the above operation will be repeated for the remaining teeth.

If the saw tooth is a short stubby tooth with an abrupt curvature at the back side, the saw-rest will be adjusted so as to bring the center line 29 nearer to the gage finger, while if the tooth is a longer tooth as illustrated in the drawing, the saw-rest will be adjusted in the opposite direction. The angular relation between the gage edge 8 and the arm 21 is always the same for all saw teeth, and by means of my device it is possible to give the correct shape to the teeth of any saw which can be accommodated on the device. As a general rule, the saw teeth are set before they are ground, and I have, therefore, made the gage finger 7 with the recess 40 to accommodate the set of the teeth.

One important result secured by the use of my device is that the saw will be ground true to center. This is so because having once properly adjusted the saw-centering member on the rod 21, all the teeth must of necessity be ground or shaped so that they will be the same distance from the center. My improved device will, therefore, not only gum, but in doing so will sharpen the teeth and give them the proper size and shape.

The device is simple and inexpensive to make and is easy to use.

The invention is not confined to the particular embodiment illustrated, as various changes in the constructional details may be made without departing from the invention.

Having fully described my invention, what I claim as new and desire to secure by Letters Patent is:—

1. In a device for grinding and gumming saws, the combination with a holder having a stem, of means embracing said stem and adapted to support the holder for turning movement about the stem, a saw rest sustained by the holder, a saw-centering device also sustained by the holder, and a stop on the supporting means to limit the turning movement of the holder.

2. In a device for grinding and gumming saws, the combination with a holder, of a saw rest sustained by the holder, a saw-centering member associated with said saw rest, said holder having a stem, a sleeve in which said stem is supported for turning movement about an axis which coincides with the center of the arc of curvature of that tooth of the saw which is in position to be ground, said sleeve and holder having coöperating stop shoulders to limit the turning movement of the holder after the point of said tooth has been carried past the grinding wheel whereby the saw can be adjusted about the centering member to bring a new tooth into position to be ground.

3. In a device for grinding and gumming saws, the combination with a holder, of a saw rest sustained by the holder, a saw-centering member associated with said saw rest, said holder having a stem, a sleeve in which said stem is supported for free turning movement about an axis which coincides with the center of the arc of curvature of that tooth of the saw which is in position to be ground, said sleeve and holder having coöperating stop shoulders to limit the turning movement of the holder after the point of said tooth has been carried past the grinding wheel whereby the saw can be adjusted about the centering member to bring a new tooth into position to be ground, and a second stop to limit the swinging movement of the holder in the opposite direction.

4. In a saw-grinding and gumming machine, the combination with a grinding element, of a saw rest, a saw-centering device, a support to sustain the saw rest and centering device for bodily turning movement about an axis which coincides with the center of the arc of curvature of the back side of that tooth of the saw which is in position to be ground whereby when the saw rest is thus turned, said tooth will be moved across the grinding element thereby causing said tooth to be properly ground and means to permit of adjusting said saw rest relative to its axis of motion in a radial direction whereby the tooth may be ground with a greater or less curvature.

5. In a machine of the class described, the combination with a holder mounted to turn about an axis, of a combined saw-rest and gage finger sustained by said holder for adjustment in a direction to move the gage finger toward and from the axis of rotation, and a saw-centering member adjustably carried by the combined gage finger and saw-rest.

6. In a device of the class described, the combination with a holder mounted for turning movement, of a combined gage finger and saw-rest mounted on said support for longitudinal adjustment and also for angular adjustment, and a saw-centering member adjustably carried by the combined saw-rest and gage finger.

7. In a device of the class described, the combination with a saw-rest, of means to support the same for turning movement, a rod extending therefrom, a sleeve adjustably mounted on the rod, a saw-centering member also slidably mounted on the rod and adjustably connected to the said sleeve, and means to clamp the sleeve in position on the rod.

8. In a device for gumming and grinding saws, the combination with a holder, of a saw rest sustained thereby, a saw-centering member, means to sustain the holder for turning movement about an axis which coincides with the center of the arc of curvature of that tooth of the saw which is in position to be ground, and means permitting the saw rest to be adjusted on the holder in a direction transverse to said axis whereby the teeth may be ground to a greater or less curvature depending on the adjusted position of the saw rest.

9. In a device for gumming and grinding saws, the combination with a holder, of a saw rest sustained thereby, a saw-centering member, means to sustain the holder for turning movement about an axis which coincides with the center of the arc of curvature of that tooth of the saw which is in position to be ground, means permitting the saw rest to be adjusted on the holder in a direction transverse to said axis, and means permitting said saw rest to be adjusted on the holder to bring the plane occupied by the saw when supported on said rest into different angular positions relative to said axis.

10. In a device for grinding and gumming saws, the combination with a saw rest, of a saw-centering member, means to sustain the saw rest and centering member for free turning movement about an axis eccentric to the center of the saw when positioned by the centering member and which coincides with the center of the arc of curvature of the back side of that tooth of the saw which is in position to be ground, and means permitting the saw rest to be adjusted into different angular positions relative to said axis.

In testimony whereof, I have signed my name to this specification, in the presence of two subscribing witnesses.

ROBERT V. PEARCE.

Witnesses:
  LOUIS C. SMITH,
  THOMAS J. DRUMMOND.

---

Copies of this patent may be obtained for five cents each, by addressing the "Commissioner of Patents, Washington, D. C."